(12) United States Patent
Li et al.

(10) Patent No.: US 11,960,497 B2
(45) Date of Patent: Apr. 16, 2024

(54) METHOD AND SYSTEM FOR AUTOMATICALLY GENERATING DATA DETERMINING RESULT

(71) Applicant: GUANGZHOU QUICK DECISION INFORMATION TECHNOLOGY CO., LTD., Guangzhou (CN)

(72) Inventors: Shaohui Li, Guangzhou (CN); Tianshui Li, Guangzhou (CN); Lianwang Wu, Guangzhou (CN)

(73) Assignee: GUANGZHOU QUICK DECISION INFORMATION TECHNOLOGY CO., LTD., Guangzhou (CN)

( * ) Notice: Subject to any disclaimer, the term of this patent is extended or adjusted under 35 U.S.C. 154(b) by 182 days.

(21) Appl. No.: 17/606,954

(22) PCT Filed: Mar. 5, 2021

(86) PCT No.: PCT/CN2021/079183
§ 371 (c)(1),
(2) Date: Oct. 27, 2021

(87) PCT Pub. No.: WO2021/175301
PCT Pub. Date: Sep. 10, 2021

(65) Prior Publication Data
US 2022/0222267 A1    Jul. 14, 2022

(30) Foreign Application Priority Data

Mar. 5, 2020  (CN) .......................... 202010145527.9
Mar. 5, 2020  (CN) .......................... 202010147643.4

(51) Int. Cl.
*G06F 16/25*      (2019.01)
*G06F 16/2458*    (2019.01)
(Continued)

(52) U.S. Cl.
CPC ........ *G06F 16/254* (2019.01); *G06F 16/2471* (2019.01); *G06F 16/248* (2019.01); *G06F 16/256* (2019.01); *G06F 16/27* (2019.01)

(58) Field of Classification Search
CPC .... G06F 16/254; G06F 16/2471; G06F 16/27; G06F 16/256; G06F 16/248
(Continued)

(56) References Cited

U.S. PATENT DOCUMENTS 8,429,179 B1 * 4/2013 Mirhaji ............... G06F 16/3329
                                                       707/756
11,308,106 B1 * 4/2022 Muralimanohar ...... G06F 16/27
(Continued)

FOREIGN PATENT DOCUMENTS

CN          1955959 A      5/2007
CN        101315680 A     12/2008
(Continued)

OTHER PUBLICATIONS

ER, Fat "How to view the analysis of the questionnaire data?" Oct. 10, 2017 https://www.douban.com/group/topic/108340806/.
(Continued)

*Primary Examiner* — Robert W Beausoliel, Jr.
*Assistant Examiner* — Lauren Zannah Ganger
(74) *Attorney, Agent, or Firm* — Bayramoglu Law Offices LLC

(57) ABSTRACT

A method and system for automatically generating a data determining result includes an acquisition end sending a data acquisition module to a plurality of user terminals, and sending the first data fed back by the user terminals on the data acquisition module to an analysis end. The analysis end generates a display manner of the data determination result on the basis of a configuration condition. The display manner includes analysis items, a first operation logic for
(Continued)

300

| The acquisition end sends a data acquisition module to a plurality of user terminals, and sends first data fed back by the user terminals on the data acquisition module to the analysis end |
| 310 |

↓

| The analysis end generates a data determination result display manner on the basis of a configuration condition, herein the display manner inlcuds analysis items, a first operation logic for determining analysis values of the analysis items and/or a second operation logic for determining cross analysis values of different analysis items |
| 320 |

↓

| The analysis end determines the analysis values of the analysis items and/or the cross analysis values of different analysis values of the display manner in the first data |
| 330 | determining analysis values of the analysis items and/or a second operation logic for determining cross analysis values of different analysis items. The analysis end determines the analysis value of the analysis items and/or the cross analysis value of the different analysis items in the display manner from the first data, and generates a data determination result.

16 Claims, 4 Drawing Sheets

(51) Int. Cl.
  *G06F 16/248*  (2019.01)
  *G06F 16/27*  (2019.01)
(58) Field of Classification Search
  USPC ........................................................ 707/602
  See application file for complete search history.

(56) References Cited

U.S. PATENT DOCUMENTS

| | | | |
|---|---|---|---|
| 2007/0067575 A1 | 3/2007 | Morris et al. | |
| 2007/0239768 A1* | 10/2007 | Quinn-Jacobs | ....... G06F 16/248 |
| | | | 707/999.102 |
| 2009/0282354 A1* | 11/2009 | Poulson | .................. G06F 40/18 |
| | | | 715/810 |
| 2016/0224645 A1* | 8/2016 | Dang | .................... G06F 16/254 |
| 2020/0394672 A1* | 12/2020 | Simon | ...................... G06F 16/27 |

FOREIGN PATENT DOCUMENTS

| | | |
|---|---|---|
| CN | 102006505 A | 4/2011 |
| CN | 102231869 A | 11/2011 |
| CN | 103714471 A | 4/2014 |
| CN | 104484435 A | 4/2015 |
| CN | 103699660 A | 10/2016 |
| CN | 106845272 A | 6/2017 |
| CN | 108133041 A | 6/2018 |
| CN | 108475259 A | 8/2018 |
| CN | 110704463 A | 1/2020 |
| CN | 110837551 A | 2/2020 |
| CN | 111367973 A | 7/2020 |
| CN | 111367979 A | 7/2020 |
| JP | 2010108058 A | 5/2010 |

OTHER PUBLICATIONS

"Data analysis operation of Tencent questionnaire" Oct. 22, 2015 https://jingyan.baidu.com/article/f0e83a25873bcf22e491016b.html.

* cited by examiner

300

┌─────────────────────────────────────────────────────────────────────┐
│ The acquisition end sends a data acquisition module to a plurality of user terminals, │
│ and sends first data fed back by the user terminals on the data acquisition module to │
│ the analysis end │
│ 310 │
└─────────────────────────────────────────────────────────────────────┘
                                    ▼
┌─────────────────────────────────────────────────────────────────────┐
│ The analysis end generates a data determination result display manner on the basis of │
│ a configuration condition, herein the display manner inclueds analysis items, a first │
│ operation logic for determining analysis values of the analysis items and/or a second │
│ operation logic for determining cross analysis values of different analysis items │
│ 320 │
└─────────────────────────────────────────────────────────────────────┘
                                    ▼
┌─────────────────────────────────────────────────────────────────────┐
│ The analysis end determines the analysis values of the analysis items and/or the cross │
│ analysis values of different analysis values of the display manner in the first data │
│ 330 │
└─────────────────────────────────────────────────────────────────────┘

┌─────────────────────────────────────────────────────────────────────┐
│ The analysis end generates a configuration option unit on the basis of the data │
│ acquisition module, and sends the configuration option unit to the acquisition end │
│ 410 │
└─────────────────────────────────────────────────────────────────────┘
                                    ▼
┌─────────────────────────────────────────────────────────────────────┐
│ The analysis end extractes the analysis items, and a position relationship and a logical │
│ relationship among the alaysis items on the basis of the third data fed back by the │
│ configuration option unit, and generates a configuartion condition │
│ 420 │
└─────────────────────────────────────────────────────────────────────┘

| Information related to a user type is extracted from the user data | 702 |

↓

| The user data is cached to a first storage space matched with the information | 704 |

Acquisition end

820

Storage end

Fig. 8

METHOD AND SYSTEM FOR AUTOMATICALLY GENERATING DATA DETERMINING RESULT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The application relates to the technical field of computers, and in particular, to a method and system for automatically generating a data determination result.

2. Description of Related Art Including Information Disclosed Under 37 CFR 1.97 and 37 CFR 1.98

For most investigation reports or data that needs to be analyzed and determined, formatted data is exported by a data analyst with respect to each item, and customized report programming is performed through software. Each item correspondingly needs to be programmed step by step with codes to output the whole report. Under the requirements of more diversification and efficiency, it is often necessary to acquire data directly from the system for direct analysis during survey analysis and data analysis, which can also be performed by people who do not know code programming.

BRIEF SUMMARY OF THE INVENTION

One aspect of the specification provides a method for automatically generating a data determination result. The method may include the following operations. An acquisition end sends a data acquisition module to a plurality of user terminals, and sends the first data fed back by the user terminals on the data acquisition module to an analysis end. The analysis end generates a display manner of the data determination result on the basis of a configuration condition, herein the display manner includes analysis items, a first operation logic for determining analysis values of the analysis items and/or a second operation logic for determining cross analysis values of different analysis items. The analysis end determines the analysis value of the analysis items and/or the cross analysis value of the different analysis items in the display manner from the first data, and generates a data determination result.

Another aspect of the specification provides a system for automatically generating a data determination result. The system includes an acquisition end and an analysis end. The acquisition end is configured to send a data acquisition module to a plurality of user terminals, and send first data fed back by the user terminals on the data acquisition module to the analysis end. The analysis end is configured to generate a display manner of the data determination result on the basis of a configuration condition, herein the display manner includes analysis items, a first operation logic for determining analysis values of the analysis items and/or a second operation logic for determining cross analysis values of different analysis items, and is configured to determine the analysis value of the analysis items and/or the cross analysis value of the different analysis items in the display manner from the first data, and generate a data determination result.

Another aspect of the specification provides an apparatus for automatically generating a data determination result. The apparatus includes a processor. The processor is configured to execute the method.

Another aspect of the specification provides a computer readable storage medium. The storage medium stores computer instructions. A computer executes the method after reading the computer instructions in the storage medium.

BRIEF DESCRIPTION OF THE SEVERAL VIEWS OF THE DRAWINGS

The specification will be further described with exemplary embodiments. These exemplary embodiments will be described in detail through accompanying drawings. These embodiments are unrestrictive. In these embodiments, the same numbers represent the same structures.

FIG. 3 is an exemplary flowchart of a first implementation manner of a method for automatically generating a data determination result according to some embodiments of the specification.

FIG. 4 is an exemplary flowchart of a method for generating a configuration condition according to some embodiments of the specification.

FIG. 7 is an exemplary flowchart of caching user data to a first storage space according to some embodiments of the specification.

FIG. 8 is a module diagram of a second implementation manner of a system for automatically generating a data determination result according to some embodiments of the specification.

DETAILED DESCRIPTION OF THE INVENTION

Figure 1:
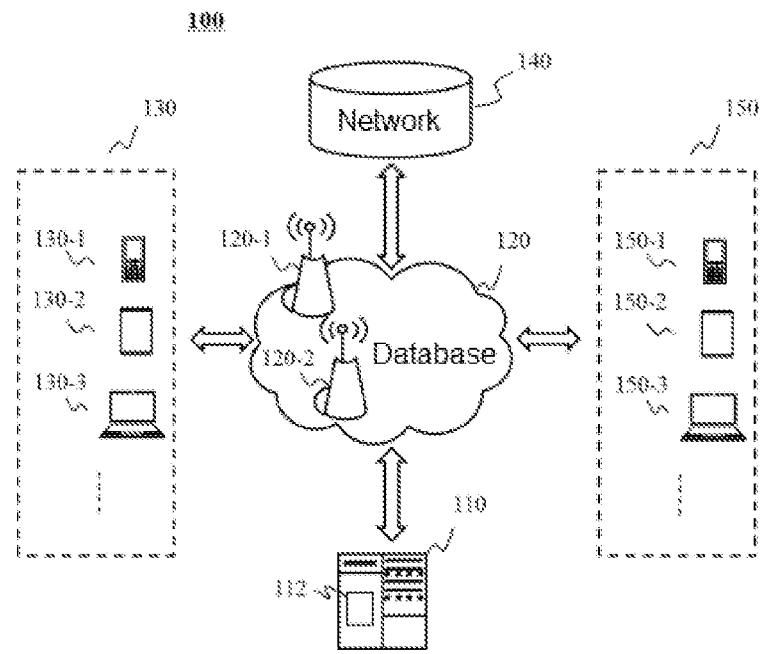
FIG. 1 is a schematic diagram of a first implementation manner of an application scenario of a system for automatically generating a data determination result according to some embodiments of the specification.

To describe technical solutions in embodiments of the specification more clearly, the following briefly describes the accompanying drawings required for describing the embodiments. It is apparent that the accompanying drawings in the following description are only some examples or embodiments of the specification. Those skilled in the art can also apply the specification to other similar situations according to the these accompanying drawings without any creative work. Unless apparent from the language environment or otherwise stated, the same reference signs in the drawings represent the same structures or operations.

It should be understood that "system", "apparatus", "unit", and/or "module" used in the specification are/is methods/a method used to distinguish different components, elements, parts, portions, or assemblies of different levels. However, if other terms may achieve the same purpose, these terms may be replaced with other expressions.

As shown in the specification and the claims, terms such as "a/an", "one", "a kind of", and "the" do not refer in particular to a singular form but may also include a plural form, unless exceptional cases are clearly indicated in the context. In general, terms "include" and "contain" only indicate inclusion of steps and elements that are clearly identified, these steps and elements do not form an exclusive enumeration, and a method or equipment may also include other steps or elements.

In the specification, the flowchart is used to describe operations executed by a system according to the embodiments of the specification. It should be understood that previous or subsequent operations are not always executed accurately in sequence. Instead, each step may be processed in an inverted sequence or at the same time. In addition, other operations may also be added to these processes, or one or more operations may be removed from these processes.

FIG. 1 is a schematic diagram of an application scenario of a system for automatically generating a data determination result according to some embodiments of the specification.

The system for automatically generating a data determination result 100 may automatically generate a data determination result by implementing the method and/or process disclosed in the application. In some embodiments, the system for automatically generating a data determination result may be applied to the field of data survey and analysis. The fed back first data is recovered survey questionnaires. The first data includes analysis data, such as survey questionnaire content (for example, all question content included in a questionnaire to survey which flavor of instant noodles people like), answer content fed back by users to survey questionnaires (for example, a text answer filled by the users about which flavor of instant noodles people like or an answer chosen according to answer options) and/or related information of the users participating in a survey (for example, the number of people participating in the survey, the number of males and females, the number of people corresponding to various ages, regions where the users are located, etc.). The system for automatically generating a data determination result may automatically analyze and determine the analysis data, such as the question, the answer, and the related information of the users, of the recovered survey questionnaires to obtain required survey results. For example, the proportion of females who like to eat the instant noodles with a pickled pepper taste, and which age of people like to eat the instant noodles with the pickled pepper taste most.

As shown in FIG. 1, the system for automatically generating a data determination result 100 may include a server 110, a network 120, a user terminal 130, a database 140, and an acquisition terminal 150. The server 110 may include a processing device 112.

In some embodiments, the server 110 may be configured to process information and/or data related to data processing. In some embodiments, the server 110 may be directly connected to the database 140 and/or the user terminal 130 and/or the acquisition terminal 150 to access the information and/or data stored therein. For example, the server 110 may acquire data from the database to analyze and determine a result through the network 120. For example, the server 110 may access the data input by the user terminal 130 through the network 120, and use the data for analyzing and determining a result. For another example, the server 110 may access the data of the acquisition terminal 150 through the network 120, and use the data to analyze and determine a result. The server 110 may be an independent server or a server group. The server group may be integrated or distributed (for example, the server 110 may be a distributed system). In some embodiments, the server 110 may be regional or remote. In some embodiments, the server 110 may be executed on a cloud platform. For example, the cloud platform may include one or any combination of private cloud, public cloud, mixed cloud, community cloud, distributed cloud, internal cloud, etc.

In some embodiments, the server 110 may include a processing device 112. The processing device 112 may process data and/or information to execute one or more functions of the analysis end described in the application. For example, the processing device 112 may generate a display manner for the data determination result on the basis of a configuration condition, determine analysis values of the analysis items and/or cross analysis values of the different analysis items in the display manner from the first data, and generate a data determination result. For another example, the processing device 112 may also determine analysis items respectively included in a row header and a line header in the display manner and the positions of the analysis items on the basis of the configuration condition, and determine a first operation logic and a second operation logic on the basis of the logical relationship. In some embodiments, the processing device 112 may include one or more sub-processing devices (for example, a single-core processing device or a multi-kernel and multi-core processing device). As an example merely, the processing device 112 may include a Central Processing Unit (CPU), an Application Specific Integrated Circuit (ASIC), an Application Specific Instruction Set Processor (ASIP), a Graphics Processor (GPU), a Physical Processor (PPU), a Digital Signal Processor (DSP), a Field Programmable Gate Array (FPGA), a Programmable Logical Circuit (PLD), a controller, a micro-controller unit, a Reduced Instruction Set Computer (RISC), a microprocessor, etc. or any combination of the above.

In some embodiments, the network 120 may facilitate exchange of data and/or information, and the data and/or the information may include the data input by the user terminal 130, the data stored in the database 140, data related to analysis and determination result in the server 110, the data of the acquisition terminal 150, etc. In some embodiments, one or more components (for example, the server 110, the user terminal 130, the database 140, and the acquisition terminal 150) in the system for automatically generating a data determination result 100 may send data and/or information to other components in the system for automatically generating a data determination result 100 through the network 120. In some embodiments, the network 120 may be any type of wired or wireless network. For example, the network 120 may include a cable network, a wired network, an optical fiber network, a telecommunication network, an internal network, the Internet, a Local Area Network (LAN), a Wide Area Network (WAN), a Wireless LAN (WLAN), a Metropolitan Area Network (MAN), a Public Switched Telephone Network (PSTN), a Bluetooth network, a ZigBee network, a Near Field Communication (NFC) network, or any combination of the above. In some embodiments, the network 120 may include one or more network access points. For example, the network 120 may include wired or wireless network access points, for example, base station and/or Internet switch points 120-1, 120-2, . . . . Through these access points, one or more components of the system 100 may be connected to the network 120 to exchange data and/or information.

In some embodiments, the user terminal 130 may be a computing device or a computing device group. In some embodiments, the user terminal 130 has an input function, and may be configured for a user to input the fed back first data. For example, typing, voice input, etc. The computing device may include one or any combination of a mobile phone 130-1, a tablet computer 130-2, a notebook computer 130-3, a desktop computer 130-4, etc. The computing device may be integrated or distributed. In some embodiments, the user terminal 130 may send the input content to the server 110. Correspondingly, the server 110 may send data related to an analysis and determination result of the input content to the user terminal 130.

In some embodiments, the database 140 may be configured to store analysis data (that includes but is not limited to the data of the user terminal 130, the data of the acquisition terminal 150, and the data of the server 110). The database 140 may be implemented in a single central server, and a plurality of servers or a plurality of personal devices connected through communication links. The database 140 may be generated by a plurality of personal devices and a cloud server. In some embodiments, the database 140 may be configured to a device or original media for providing required data, and may also be configured for the operations of storage, encryption, etc. of the data. In some embodiments, the database 140 may store information and/or instructions executed or used by the server 110 to execute exemplary methods described in the application. In some embodiments, the database 140 may include a high-capacity memory, a removable memory, a volatile read-write memory (for example, a Random Access Memory (RAM)), a Read-Only Memory (ROM), or any combination of above. In some embodiments, the database 140 may be implemented on a cloud platform. For example, the cloud platform may include private cloud, public cloud, mixed cloud, community cloud, distributed cloud, internal cloud, etc., or any combination of above.

In some embodiments, the acquisition terminal 150 may be a computing device or a computing device group. In some embodiments, the acquisition terminal 150 has an input function, and may be configured to input item content of acquisition data (for example, item content of various forms of survey questionnaire, videos, etc.) in various input forms of typing, input voice, etc., which is not limited in the embodiment. The computing device may include one or any combination of a mobile phone 130-1, a tablet computer 130-2, a notebook computer 130-3, a desktop computer 130-4, etc. The computing device may be integrated or distributed. In some embodiments, the acquisition terminal 150 may send the input acquisition content to the server 110 or the user terminal 130. Correspondingly, the user terminal 130 may send first data fed back on the item content to the acquisition terminal 150. The server 110 may send the data related to the analysis and determination result of the analysis data to the acquisition terminal 150.

Figure 2:
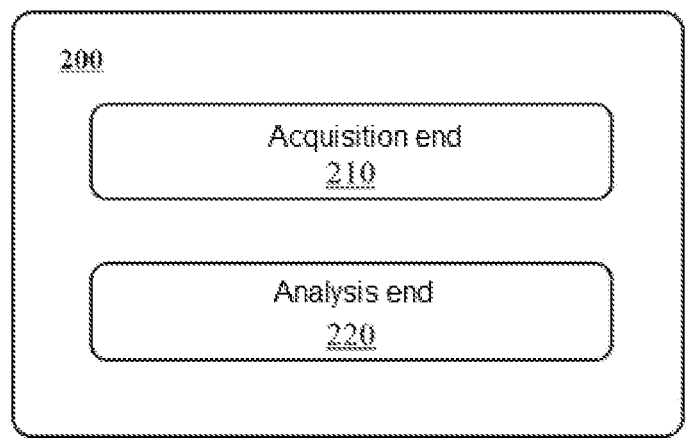
FIG. 2 is a module diagram of a first implementation manner of a system for automatically generating a data determination result according to some embodiments of the specification.

FIG. 2 is a schematic diagram of an exemplary system for automatically generating a data determination result according to some embodiments of the specification. As shown in FIG. 2, the system for automatically generating a data determination result 200 includes an acquisition end 210 and an analysis end 220.

The acquisition end 220 is configured to send a data acquisition module to a plurality of user terminals 130, and send the first data fed back by the user terminals 130 on the data acquisition module to an analysis end.

In some embodiments, the acquisition end 220 is further configured to transmit second data to the analysis end when the user terminals feed back the first data. In some embodiments, the second data includes position information of the user terminals, device information of the user terminals, and the device use information of the user terminals.

The analysis end 220 is configured to generate a display manner of the data determination result on the basis of a configuration condition. The display manner includes analysis items, a first operation logic for determining analysis values of the analysis items and/or a second operation logic for determining cross analysis values of different analysis items. The analysis end 220 is configured to determine the analysis values of the analysis items and/or the cross analysis values of the different analysis items in the display manner from the first data, and generate a data determination result. In some embodiments, the configuration condition includes the analysis items and a position relationship and a logical relationship among the analysis items.

In some embodiments, the analysis end 220 is configured to determine the analysis value of the analysis items and/or the cross analysis value of the different analysis items in the display manner from the first data and the second data, and generate a data determination result.

In some embodiments, the analysis end 220 is further configured to determine analysis items respectively included in a row header and a line header in the display manner and the positions of the analysis items on the basis of the configuration condition, and determine a first operation logic and a second operation logic on the basis of the logical relationship.

In some embodiments, the analysis end 220 is further configured to respectively map the first data with the analysis items in the row header and the analysis items in the line header to obtain a statistical value of the analysis items and a cross statistical value of the different analysis items, perform an operation on the statistical values by using the first operation logic to obtain the analysis values, and perform an operation on the statistical values and/or the cross statistical values by using the second operation logic to obtain the cross analysis values.

In some embodiments, the analysis end 220 is further configured to encode the analysis items of the row header or the line header, add a code of the analysis item to the analysis value of the other analysis items when an error between the analysis value of the analysis item and the analysis value of the other analysis items in the row header or the line header is greater than a first preset threshold value, obtain a first cross analysis value on the basis of the analysis item and the first analysis item, obtain a second cross analysis value on the basis of the other analysis items and the first analysis item, and add a code of the analysis item to the second cross analysis value when an error between the first cross analysis value and the second cross analysis value is greater than a second preset threshold value. The first analysis item is from the analysis items of the row header and/or the line header.

In some embodiments, the analysis end 220 is further configured to generate a configuration option unit on the basis of the data acquisition module, and send the configuration option unit to the acquisition end, extract the analysis items, and the position relationship and the logical relationship among the analysis items from third data fed back by the acquisition end on the configuration option unit, and generate the configuration condition. The analysis end 220 is further configured to cache the third data.

In some embodiments, the analysis end 220 is further configured to configure a confidence degree for the data determination result, and the confidence degree is in positive correlation with the data volume of the first data.

It should be understood that the system and modules thereof shown in FIG. 2 may be implemented in various manners. For example, in some embodiments, the system and the modules thereof may be implemented by hardware, software, or a combination of software and hardware. The hardware part may be implemented by a special logic. The software part may be stored in a memory and executed by a proper instruction execution system such as a microprocessor or dedicated design hardware. Those skilled in the art can understand that the previously described method and system may be implemented by using a computer-executable instruction and/or including in a processor control code. Such a code is provided in, for example, a carrier medium like a magnetic disk, a Compact Disc (CD), or a Digital Video Disk-Read Only Memory (DVD-ROM), a programmable memory like a read-only memory (firmware), or a data carrier like an optical or electronic signal carrier. The system and modules thereof in the application may be implemented by a hardware circuit, for example, a very-large-scale integrated circuit or gate array, a semiconductor like a logic chip, a transistor, etc., or a programmable hardware device like a field-programmable gate array, a programmable logic device, etc., or may be implemented by, for example, various types of software executed by a processor, or may be implemented by a combination (for example, firmware) of the hardware circuit and the software.

It is to be noted that the above description about a system for automatically generating a data determination result 200 and modules thereof is only for ease of description and cannot limit the specification to the scope of the listed embodiments. It can be understood that those skilled in the art, after understanding the principle of the system, may freely combine each module or form subsystems for connection with the other modules without departing from the principle. For example, the acquisition end 210 and the analysis end 220 disclosed in FIG. 2 may share the same storage module. Various modules may also have respective storage modules. Such transformations all fall within the scope of protection of the application.

FIG. 3 is an exemplary schematic diagram of a method for automatically generating a data determination result according to some embodiments of the specification. As shown in FIG. 3, the method for automatically generating a data determination result 300 may include the following operations.

At Step 310, an acquisition end sends a data acquisition module to a plurality of user terminals, and sends the first data fed back by the user terminals on the data acquisition module to an analysis end. Specifically, Step 310 may be executed by the acquisition end 210.

The acquisition end refers to a terminal for acquiring information, for example, a computing device, for another example, a communication device of the computing device or an application program, with an information acquisition function, on the computing device. The acquisition end may input data and/or transmit data, for example, question content of a survey questionnaire is input through the acquisition end. For another example, the survey questionnaire is sent to a user that needs to be surveyed through the acquisition end.

The data acquisition module may refer to a module configured to directly orient acquisition data of the user, which carries item content of the acquisition data. The item content may be the content in various forms, such as a survey questionnaire, video, voice, and etc. In some embodiments, a data acquisition module is transmitted to a plurality of user terminals in a manner of transmitting or directly distributing by the network 120. The data acquisition module is sent to the user terminals, i.e., the item content of the acquisition data is sent to the user terminals, so that the user terminals may feed back according to the item content, for example, the answer fed back on the survey questionnaire, a viewpoint fed back on the video, etc.

The first data may refer to the data fed back by the user terminals. For example, answer content that is input by the user terminals and is fed back on the survey questionnaire. The user terminals may send the first data to the analysis end in a manner of transmitting or directly uploading through the network 120. The analysis end receives the first data, i.e., obtains the data fed back corresponding to the item content At Step 320, the analysis end generates a display manner for a data determination result on the basis of the configuration condition. The display manner includes analysis items, a first operation logic for determining analysis values of the analysis items and/or a second operation logic for determining cross analysis values of different analysis items. Specifically, Step 320 may be executed by the analysis end 220.

In some embodiments, the configuration condition refers to information and/or condition included in the display manner of the data determination result. In some embodiments, the configuration condition includes the analysis items and a position relationship and a logical relationship among the analysis items. The analysis items refer to the analysis content for data. The position relationship among the analysis items refers to the arrangement position relationship and the relative position relationship of various analysis items. For example, for a display manner of a table, it is assumed that the content set in rows are male and female and the content set in lines are clothes and trousers, and then the analysis items includes male, female, clothes, and trousers, and rows and lines are the position relationship of the analysis items. Further, operation manners may also be set when the rows and lines are set, and are used for determining some complex analysis items. The logical relationship may refer to the operation logics for performing further operation on the analysis items. For example, how to compute the ratio of males who choose clothes to all males is determined, or an operation manner may be set for further required content on the basis of the analysis items to serve as the operation logic of the analysis items. In some embodiments, the configuration condition may be selected from recommended configuration conditions provided from the analysis end, or the configuration condition may also be generated in an input manner, which is not limited in the embodiment.

The configuration condition may directly or indirectly generate a display manner of a data determination result. The display manner may be a display form or display content of the data determination result generated by the analysis end. The display manner also determines the manner of the analysis end for analyzing data and the analysis content of the data. The display manner may use various display forms, such as tables, graphics, and reports, which is not limited in the embodiment.

In some embodiments, the display manner includes analysis items, a first operation logic for determining analysis values of the analysis items and/or a second operation logic for determining cross analysis values of different analysis items. The analysis items included in the display manner may refer to the analysis content of data generated through the configuration condition. The analysis value refers to a data value corresponding to one analysis item, for example, various forms of data values, such as quantity, percentage, and grade, which is not limited in the embodiment. The first operation logic for determining the analysis values of the analysis items refers to an operation logic for calculating corresponding analysis values of various analysis items. For example, taking the previously described tubular form as an example, in the first data fed back by the user terminals, the quantities respectively corresponding to these analysis items of male, female, clothes, and trousers are taken as analysis values, and an operation logic for counting and calculating the quantities of various analysis items is the first operation logic. In some embodiments, in order to obtain more analysis on the basis of the analysis values of various analysis items, further operation may be performed on the analysis values. The second operation logic for determining a cross analysis value of different analysis items refers to an operation logic for performing analysis value cross operation on two or more items. The data value obtained by the analysis value cross operation is the cross analysis value. For example, taking the previously described table form as an example, based on the quantities respectively corresponding to these analysis items of male, female, clothes, and trousers, the quantity of males choosing clothes is the cross analysis value of the analysis items, male and clothes. The operation logic for calculating the quantity of the males choosing clothes is the second operation logic. The analysis end may analyze the fed back first data through the analysis items, the first operation logic, and/or the second operation logic.

In some embodiments, for better convenience and higher operability of data analysis, the display manner may adopt a form of tables in a unified manner. The operation that the analysis end generates a display manner of a determination result on the basis of the configuration condition may include the following operations. Analysis items respectively included in a row header and a line header in display manner and the positions of the analysis items are determined on the basis of the configuration condition. A first operation logic and a second operation logic are determined on the basis of logical relationship. The row header and the line header are header information of rows and lines in a table. The data content of a cell corresponds to the analysis item of the row header and/or line header to which the cell belongs. There may be a plurality of analysis items included in the row header and the line header. The positions of the analysis items refer to the arrangement positions and relative positions of various analysis items. In some embodiments, in order to determine some complex analysis items, the configuration condition may include a logical relationship for performing a further operation on the analysis item. More complex first operation logic and second operation logic may be further determined on the basis of the logical relationship, which are used for performing an operation and a further operation on the analysis value of a complex analysis item.

In some embodiments, the operation that the analysis end generates a display manner of the determination result on the basis of the configuration condition may further include an operation. In the operation, the analysis items of the row header or the line header are encoded. The analysis items are encoded may refer to that code information is added to the content or attribute of the analysis items. Various forms of codes, such as a number code and a letter code, may be added, which is not limited in the embodiment.

In some embodiments, when an error of the analysis value of the analysis items and the analysis value of other analysis items in the row header or line header is greater than a first preset threshold value, codes of the analysis items are added to the analysis value of the other analysis items. The first preset threshold value may be a data value recommended by the analysis end or a data value that is set by inputting. The error of the analysis values may be a difference value between the analysis values, or a difference value between an analysis value and a certain fixed value, or a difference value between the proportions of the analysis values. When an error between the analysis value of the analysis item and the analysis value of the other analysis items in the row header or the line header is greater than a first preset threshold value, i.e., the difference value between the analysis values of the analysis item and the other analysis items is great, may be much greater or much smaller, then adding the code of the analysis item to the analysis values of the other analysis items can indicate that the difference between the analysis item corresponding to the code and the other analysis items is great. For example, when the number of people in each city is surveyed and analyzed in the form of table, three analysis items, city 1 (code a), city 2 (code b), and city 3 (code c), are arranged in row headers in sequence. The number of people in the analysis item city 1 is 100, the number of people in the analysis item city 2 is 300, the number of people in the analysis item city 3 is 250, and the first preset threshold value is 200, then the code a of the analysis item city 1 is added to the analysis value of the analysis item city 2, which can be represented as 300a. Difference information among the analysis values of various analysis items may be displayed clearly and intuitively through the embodiments.

In some embodiments, a first cross analysis value may be obtained on the basis of analysis items and a first analysis item. A second cross analysis value may be obtained on the basis of other analysis items and the first analysis item. When an error between the first cross analysis value and the second cross analysis value is greater than a second preset threshold value, a code of the analysis item is added to the second cross analysis value. The first analysis item is from the analysis items of the row header and/or the line header. In some embodiments, the analysis items or other analysis items from the analysis items of the row header, and the first analysis item is from the analysis items of the line header. In some embodiments, the analysis items or other analysis items from the analysis items of the line header, and the first analysis item is from the analysis items of the row header. The second preset threshold value may be a data value recommended by the analysis end or a data value that is set by inputting. The error of a cross analysis value may be a difference value among various cross analysis values, or a difference value between each of the various cross analysis values and an error of a certain fixed value, or a difference value between the proportions of the various cross analysis values. Continuously taking the survey and analysis of the number of people in the previously described cities as an example, the analysis items of the number of people of all ages are added to the line header, and a plurality of analysis items that are arranged in sequence at the line header include the age under 17 years old (code A), the age between 18 and 24 (code B), and the age above 25 years old (code C). If the number of people at different ages in city 1 is analyzed, the number of people at the age under 17 years old in city 1 is 10, the number of people at the age between 18 and 24 years old in city 1 is 65, the number of people at the age above 25 years old in city 1 is 25, and a second preset threshold value is 50. The first analysis item may be any analysis item in the line header. If the first analysis item is the age under 17 years old, then a first analysis cross value is that the number of people at the age under 17 years old in city 1 is 10, a second analysis cross value is that the number of people at the age under between 18 and 24 years old in city 1 is 65 and the number of people at the age above 25 years old in city 1 is 25, then the code A of the analysis item of the age under 17 years old is added to the analysis value of the analysis item of the age between 18 and 24 years old in city 1, which may be represented as 65A. Difference information among the cross analysis values of various analysis items may further be displayed clearly and intuitively through the embodiments.

At Step 330, the analysis end determines analysis values of analysis items and/or cross analysis values of different analysis items in the display manner from the first data, and generates a data determination result. Specifically, Step 330 may be executed by the analysis end 220.

The analysis end may perform an operation on the first data to obtain the analysis values of various analysis items and cross analysis values of different analysis items according to the analysis items included in the display manner, a first operation logic for determining the analysis values of the analysis items and/or a second operation logic for determining the cross analysis values of the different analysis items. The determination result refers to a data result obtained after the first data is analyzed, may be analysis values of various analysis items and/or cross analysis values of different analysis items obtained by the analysis end according to the display manner, may also be a data result shown after further processing is performed on the basis of the analysis values of the various analysis items and/or the cross analysis values of the different analysis items obtained by the analysis end. The determination result may be a data result in various forms, for example, an analysis table in a tubular form, an analysis report in a text form, and an analysis diagram in a graphical form.

In some embodiments, the operation that the analysis end generates the determination result may include an operation. In the operation, the first data is mapped with each of the analysis items in the row header and the analysis items in the line header to obtain statistical values of the analysis items and cross statistical values of different analysis items. Mapping refers to that a corresponding relationship is established between the first data in the database and various analysis items. For example, one analysis item is the age between 18 and 24 years old, and then user data meting the condition in the first data corresponds to the data of the analysis item after mapping. The statistical values of the analysis items and the cross statistical values of different analysis items may be obtained by counting the mapping data of the analysis items. The statistical value refers to simple statistic information of data. The cross statistical value refers to statistic information of mapping data after a plurality of analysis items are crossed. For example, based on these analysis items of male, female, clothes, and trousers, respective corresponding quantities are respective statistical values, and number of the males choosing clothes is a cross statistical value of the analysis items of male and clothes. In some embodiments, then an operation may be performed on the statistical values to obtain the analysis values by using a first operation logic, and an operation may be performed on the statistical values and/or the cross statistical values to obtain the cross analysis values by using a second operation logic. An analysis value may be equal to a statistical value (i.e., the first operation logic may be analysis value=statistical value), may also be a data value obtained after further calculation is performed on the statistical value by using the first operation logic (for example, the first operation logic may solve the proportion of the number to the total number, and the analysis value is the data value obtained after proportion calculation is performed on the statistical value). In order to obtain more analysis on the basis of the statistical values and/or cross statistical values of various analysis items, further operation may be performed on the statistical values and/or cross statistical values by using a second operation logic. For example, the quantity of females choosing clothes is calculated on the basis of the statistical quantity of the two analysis items of females and clothes, or the quantity of males choosing both clothes and trousers is calculated on the basis of the statistical quantity of males choosing clothes and the statistical quantity of males choosing trousers.

In some embodiments, second data is transmitted to the analysis end when user terminals feed back first data. Reference is made to Step 310 and related description thereof for more details of the first data, which is not described in detail herein. In some embodiments, the second data may include position information of the user terminals, device information of the user terminals, or device use information of the user terminals. In some embodiments, the position information of the user terminals may include information of geographical positions where the user terminals are located at current and/or azimuth information corresponding to cities at the geographical positions thereof. Exemplarily, taking a geographical position where a user terminal is located being "Machikou Town, Changping District, Beijing" as an example, the azimuth information corresponding to the city "Beijing" in "Machikou Town, Changping District, Beijing" is "North", then the azimuth information of the user terminal may be "Machikou Town, Changping District, Beijing" and/or "North". In some embodiments, the device information of the user terminal may include the model number of the user terminal, user terminal IP, user terminal IME, or a sequence number of the user terminal. In some embodiments, the device use information of the user terminal may include daily use duration of a user terminal device or a daily use time period of the user terminal device.

In some embodiments, the analysis end may determine analysis values of the analysis items in the display manner from the first data and/or the second data. Exemplarily, still taking the previously described example as an example, if the second data is the position information of the user terminals, the analysis value may be the quantity of the user terminals that are located at the same geographical positions, for example, the quantity of the user terminals located in "Machikou Town, Changping District, Beijing", or may be the quantity of the user terminals located at the same city azimuth, for example, the quantity of the user terminals located at the city azimuth of North, and for another example, the quantity of the user terminals located at the city azimuth of East.

In some embodiments, the analysis end may determine cross analysis values of different analysis items in the display manner from the first data and/or the second data. Exemplarily, still taking the previously described example as an example, if the analysis items are male and female, and the second data is the position information of user terminals, then the cross analysis values may be the quantity of males that are located at the same geographical positions, for example, the quantity of the males located in "Machikou Town, Changping District, Beijing", or may be the quantity of the males located at the same city azimuth, for example, the quantity of the males located at the city azimuth of North. Reference is made to Step 320 and related description thereof for more details of the analysis value and the cross analysis value, which is not described in detail herein.

In may be known from the above description that the embodiments of the specification may generate a data determination result on the basis of the first data and the second data in addition to generating a data determination result on the basis of the first data, i.e., may generate a determination result according to user related information (for example, the position information of a user) in addition to generating the data determination result according to answer information of the user to a questionnaire, which enhances the diversity of data analysis and improves the profession degree of data analysis.

In some embodiments, a confidence degree may be configured for the data determination result. The confidence degree may refer to the reliability of the data determination result. In some embodiments, the confidence degree is in positive correlation with the data volume of the first data. For example, when the first data is questionnaires, the confidence degree of the data determination result obtained with respect to 1500 questionnaires is greater than the determination result obtained with respect to 500 questionnaires.

FIG. 4 is an exemplary flowchart of a method for generating a configuration condition according to some embodiments of the specification.

At Step 410, an analysis end generates a configuration option unit on the basis of a data acquisition module, and sends the configuration option unit to an acquisition end. Specifically, Step 410 may be executed by the analysis end 220.

The configuration option unit may be a part configured for an information configuration function, for example, a configuration device of a computing device or an application on the computing device configured for the information configuration function. The configuration option unit may include various types of information and/or condition configurations. In some embodiments, the information and/or condition configuration may include, but is not limited to, the configuration of the analysis items and a position relationship and a logical relationship among different analysis items. In some embodiments, the configuration option unit may be generated on the basis of a data acquisition module. For example, when the data acquisition module is a questionnaire, a questionnaire question, questionnaire options, sequence of the options, importance of the options, a hierarchical relationship of the options, a grade relationship of the options, etc. are taken as data of the configuration option unit.

In some embodiments, the configuration option unit may be sent to the acquisition end in a manner of transmitting or directly distributing through the network 120. The acquisition end may be configured according to information and/or condition configuration included in the configuration option unit. The acquisition end may be configured by selecting configuration information recommended by the configuration option unit or configured by generating configuration information in a manner of inputting.

At Step 420, the analysis end extracts the analysis items, the position relationship and the logical relationship among the analysis items on the basis of third data fed back by the acquisition end on the configuration option unit, and generates the configuration condition. Specifically, Step 420 may be executed by the analysis end 220.

The third data may be operation data configured by the acquisition end according to the information and/or condition configuration included in the configuration option unit. In some embodiments, the third data may be that the acquisition end performs any operation of selecting, ranking, etc. on the content in the configuration option unit. In some embodiments, the third data may be related to an analysis requirement. The acquisition end may perform an operation on the content in the configuration option unit according to the analysis requirement. For example, if the acquisition end may select options from the configuration option unit as analysis items as required. For another example, whether the analysis items are located at the line header or the row header, and the sequence at the headers, may be determined according to the importance, the grade, hierarchy, or the like of the options, i.e., the position relationship of the analysis items is determined. For another example, an operation among the options may be determined according to the analysis requirement to further obtain a logical relationship, for example, the proportions of option A in options A, B, C, and D, so that the operation of dividing the numerical value of A by the numerical value of A+B+C+D is determined as the logical relationship. The logical relationship may also be any operation logic, which is not limited in the specification. In some embodiments, the third data may be cached through a cache space (for example, a database), so as to ensure the data security of the third data. Specifically, the third data may be temporarily cached in the cache space before generating the configuration condition on the basis of the third data.

The acquisition end may transmit the third data to the analysis end in a manner of transmitting or directly uploading through the network 120, so that the analysis end may extract required data, such as analysis items, a position relationship and a logical relationship among the analysis items, etc., and generate a configuration condition.

The embodiments of the specification further provide an apparatus, at least including a processor and a memory. The memory is configured to store an instruction. When the instruction is executed by the processor, the apparatus implements the previously described method for automatically generating a data determination result. The method may include the following operations. An acquisition end sends a data acquisition module to a plurality of user terminals, and sends the first data fed back by the user terminals on the data acquisition module to an analysis end. The analysis end generates a display manner of the data determination result on the basis of a configuration condition, herein the display manner includes analysis items, a first operation logic for determining an analysis value of analysis items and/or a second operation logic for determining a cross analysis value of different analysis items. The analysis end determines the analysis value of the analysis items and/or the cross analysis value of the different analysis items in the display manner from the first data, and generates a data determination result.

The embodiments of the specification further provide a computer readable storage medium. The computer readable storage medium stores computer instructions. A computer executes the previously described directional data acquisition method after reading the computer instructions in the storage medium. The method may include the following operations. An acquisition end sends a data acquisition module to a plurality of user terminals, and sends the first data fed back by the user terminals on the data acquisition module to an analysis end. The analysis end generates a display manner of the data determination result on the basis of a configuration condition, herein the display manner includes analysis items, a first operation logic for determining an analysis value of analysis items and/or a second operation logic for determining a cross analysis value of different analysis items. The analysis end determines the analysis value of the analysis items and/or the cross analysis value of the different analysis items in the display manner from the first data, and generates a data determination result.

The embodiments of the specification may have, but not limited to, the following beneficial effects. (1) The display manner is generated through a configuration condition. The analysis end can analyze and determine data automatically to obtain a result directly after directly acquiring data from the system on the basis of the display manner. The whole method is efficient and does not require complex codes to write an analysis, and the applicability is high. (2) The difference among analysis values of different analysis items can be seen intuitively by coding different analysis items. It is to be noted that different beneficial effects may be achieved in different embodiments. The beneficial effects achievable in different embodiments may be any one or combination of the above, or may be any other achievable beneficial effects.

Figure 5:
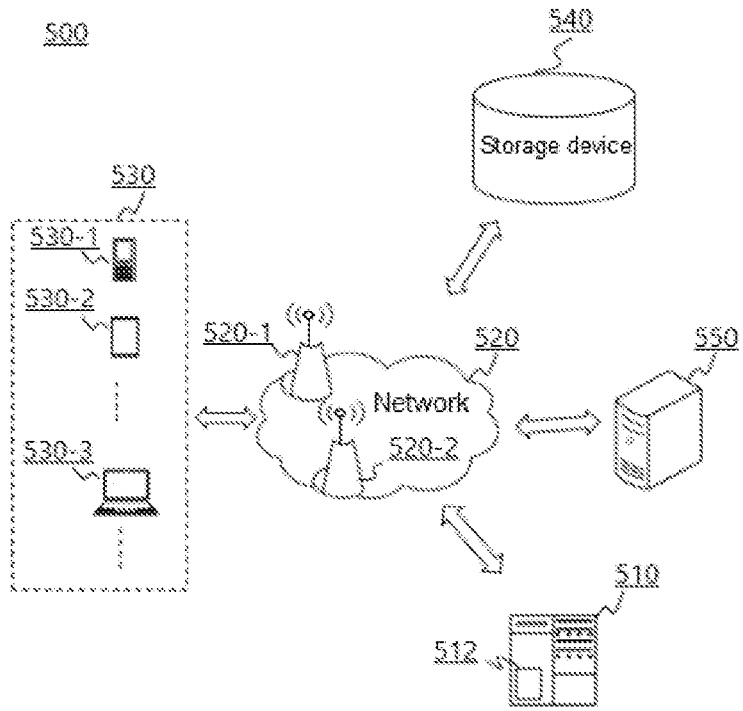
FIG. 5 is a schematic diagram of a second implementation manner of an application scenario of a system for automatically generating a data determination result according to some embodiments of the specification.

FIG. 5 is a diagram of an application scenario of a data collection system according to some embodiments of the application.

The data collection system 500 may be configured to solve the problems of slow user data acquisition and loss which may appear when collecting questionnaires answered by users when enterprises perform a questionnaire survey. The data collection system 500 may be an online service platform used for Internet services. For example, the directional data collection system 500 may be used in an collecting questionnaire survey platform.

The data collection system 500 may include a server 510, a processing device 512, a network 520, a user terminal 530, a storage device 540, and an acquisition end 550. The server 510 may include a processing device 512.

The server 510 may process the data and/or information from at least one component or external data source (for example, the acquisition end 550 or the storage device 540) of the system. In some embodiments, the server 510 may be a separate server, and may also be a computing platform consisting of a plurality of servers. A plurality of server groups may be integrated or distributed, may be dedicated or provided with service by other devices or systems at the same time.

In some embodiments, the server 510 may include a processing device 512. The processing device 512 may process data and/or information related to the data collection system 500 to execute one or more functions described in the application. For example, the processing device 512 sends an instruction to the acquisition end 550, so that the acquisition end 550 receives at least one piece of user data, and sends the user data to the storage device 540. In some embodiments, the processing device 512 may include one or more sub-processing devices (for example, a single-core processing device or a multi-kernel and multi-core processing device). As an example merely, the processing device 512 may include a Central Processing Unit (CPU), an Application Specific Integrated Circuit (ASIC), an Application Specific Instruction Set Processor (ASIP), a Graphics Processor (GPU), a Physical Processor (PPU), a Digital Signal Processor (DSP), a Field Programmable Gate Array (FPGA), a Programmable Logical Circuit (PLD), a controller, a micro-controller unit, a Reduced Instruction Set Computer (RISC), a microprocessor, etc. or any combination of the above. In some embodiments, the server 510 may be executed on a cloud platform. As an example only, the cloud platform may include private cloud, public cloud, mixed cloud, community cloud, distributed cloud, internal cloud, etc., or any combination of above.

The network 520 is connected to various components of the system, so that the various components may communicate with one another. In some embodiments, one or more components (for example, the server 510, the user terminal 530, the storage device 540, and the acquisition end 550) in the data collection system 500 may send data and/or information to other components in the data collection system 500 through the network 520. The network among various parts in the system nay be any one or more of a wired network or a wireless network. For example, the network 520 may include a cable network, a wired network, an optical fiber network, a telecommunication network, an internal network, the Internet, a Local Area Network (LAN), a Wide Area Network (WAN), a Wireless LAN (WLAN), a Metropolitan Area Network (MAN), a Public Switched Telephone Network (PSTN), a Bluetooth network, a ZigBee network, a Near Field Communication (NFC) network, or any combination thereof. The network between every two parts may use one of the above modes or a variety of the modes. In some embodiments, the network 520 may include one or more network access points. For example, the network 520 may include wired or wireless network access points, for example, base station and/or Internet switch points 520-1, 520-2, . . . . Through these access points, one or more components of the data collection system 500 may be connected to the network 520 to exchange data and/or information.

The user terminal 530 may be one or more terminal devices or software that is used by a user (for example, a respondent of a survey questionnaire, etc.) and is configured to feed back data (for example, one or more answers to survey questions), or may include one or any combination of a mobile phone 530-1, a tablet computer 530-2, a notebook computer 530-3, etc. In some embodiments, the user terminals are mainly configured for users to answer questions online. In some embodiments, the user terminals 530 may be used by one or more users, which may include users who directly use the service or other relevant users. In some embodiments, the target object terminal 530 may send the fed back (i.e., answered) data to the server 510, and the server 510 sends the data to the storage device. In some embodiments, the user terminal 530 may include various types of devices with information receiving and/or transmitting functions, for example, may be a computer, a smart phone, or a vehicle-mounted terminal device. The previously described example is only used to illustrate the universality of the scope of the device, rather than limiting the scope thereof.

The storage device 540 may store data and/or instructions. The storage device 540 may include one or more storage components. Each storage component may be an independent device, or may also be a part of other devices. For example, the storage device 540 may include a first storage space, a data warehouse, and a second storage space. The first storage space, the data warehouse, and the second storage space may be respectively located in different devices, or may be a part of the same device. The database 540 may be configured to provide a source of other information for the data collection system 500. The database 540 may be configured to provide service related information for the data collection system 500. For example, the number of users answering questions online, the duration of the users answering questions online, the number of text words entered by the users, etc. For another example, the storage device 540 may further include the information of users answering questions online, historical answers, etc. The information of the users may include user names, user ages, user occupations, etc. The storage device 540 may be implemented in a single central server, and a plurality of servers or a plurality of personal devices connected through communication links. The storage device 540 may be generated by a plurality of personal devices and a cloud server. In some embodiments, the storage device 540 may store the data fed back from the user terminals 530, for example, the answers of the respondents to the survey questions. In some embodiments, the storage device 540 may store information and/or instructions executed or used by the server 510 to execute exemplary methods described in the application. In some embodiments, the storage device 540 may include a high-capacity memory, a removable memory, a volatile read-write memory, a Read-Only Memory (ROM), or any combination thereof. In some embodiments, the storage device 540 may be implemented on a cloud platform. For example, the cloud platform may include private cloud, public cloud, mixed cloud, community cloud, distributed cloud, internal cloud, etc., or any combination of above. In some embodiments, the storage device 540 may be a part of the server 510.

In some embodiments, the acquisition end 550 may be a terminal configured to receive user data and send the user data, for example, a terminal device configured for a user to receive a survey questionnaire, answer questions, and feed back the survey questionnaire. In some embodiments, the acquisition end 550 may also be a terminal for processing the received feedback data, for example, a terminal device for encrypting the user data answered by a respondent to survey questions. The acquisition end 550 may be one or any combination of a mobile phone, a tablet computer, a notebook computer, etc.

It should be noted that the description of the application scenario is for illustrative purpose and is not intended to limit the scope of protection of the application. Various modifications and variations may be made by those skilled in the art under the guidance of the application. However, these modifications and variations will not depart from the scope of protection of the application.

Figure 6:
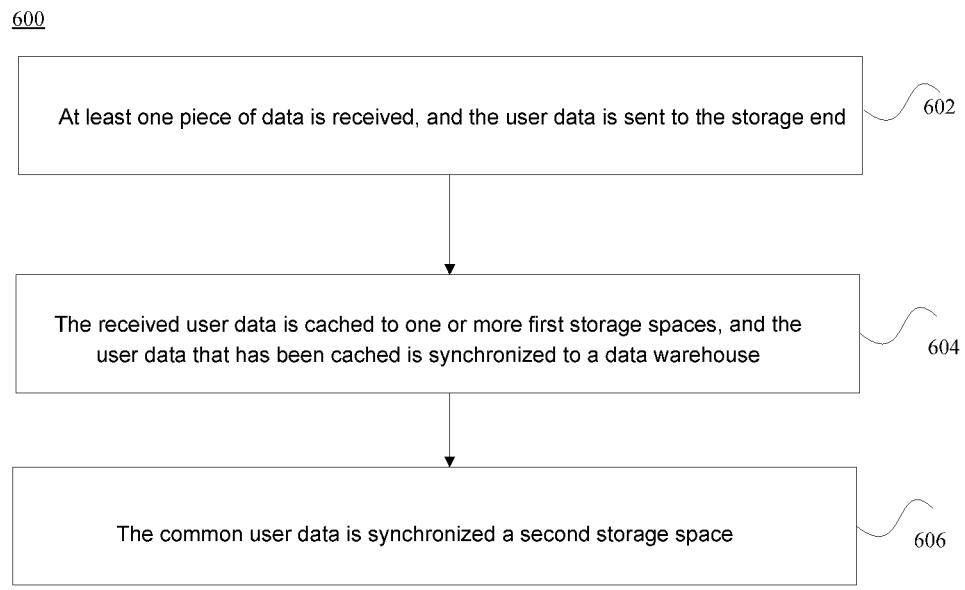
FIG. 6 is an exemplary flowchart of a second implementation manner of a method for automatically generating a data determination result according to some embodiments of the specification.

FIG. 6 is an exemplary flowchart of a data collection method according to some embodiments of the application. As shown in FIG. 6, a process 600 may include the following operations.

At Step 602, at least one piece of user data is received, and is sent to a storage end. Specifically, Step 602 may be executed by the acquisition end 810.

In some embodiments, the user data may include any form of data, for example, documents, texts, letters, numbers, pictures, voice, video, two-dimensional bar code, various program codes, etc. In some embodiments, the acquisition end may have a plurality of functions. In some embodiments, the acquisition end may have corresponding functions according to different application scenarios. For example, the acquisition end may be applied to a questionnaire survey scenario. Correspondingly, the acquisition end may have the functions of receiving, processing, and sending a survey questionnaire. The user data may be the survey questionnaire after a user completes answers. The acquisition end may send the user data to the storage end through a network (for example, the network 520).

In some embodiments, the storage end may be configured to receive, store, process, and send the user data, etc. For example, the storage end may receive the survey questionnaire from the acquisition end, and perform processing (for example, encrypting, decrypting, splitting, merging, computing, and analyzing) on the survey questionnaire. The storage end may include one or more devices. For example, the storage end may be one or more servers. Each server may store user data. Various servers may send/receive the user data to/from one another.

In some embodiments, the acquisition end may perform processing on the user data, for example, encrypt the user data, after receiving the user data. An encryption manner may include one or a combination of token encryption, a public key encryption technology, digital certificate, symmetric encryption, asymmetric encryption, etc. In some embodiments, the acquisition end may select a token encryption manner to encrypt the user data. A token configured to encrypt may be generated in a plurality of manners. As an example, the token is generated in the manner shown below.

In some embodiments, request parameters may be ranked first, all request parameters except a signature are ranked in ascending order according to a key, and the values of the request parameters do not need to be encoded. For example, it is assumed that a timestamp of the current time is 157363833, and there are three parameters c=3, b=2, and a=1. After the timestamp is added, then the parameters are ranked as a=1, b=2, c=3, and_timestamp=1573638336 after being ranked in the ascending order according to the key. However, parameters keys and parameter values may be connected into a character string by using character string splicing, so as to obtain a spliced character: a1b2c3_timestamp1573638336. Finally, an appkey may be applied. The appkey may be connected to the head and the tail of the character string. 32-Bit MD5 encryption is performed after splicing, and finally, an obtained MD5 encrypted digest is capitalized. It is assumed that appkey=test, and md5 (testa1b2c3_timestamp1573638336test), so a finally obtained token value is the obtained MD5 digest value C5F3EB5D7DC2748AED89E90AF00081E6.

In some embodiments, the storage end may decrypt the encrypted user data first before caching the user data. The storage end may decrypt the user data by selecting a corresponding decryption manner according to an encryption manner of the user data. For example, taking token encryption as an example, the storage end may decrypt the user data by using an algorithm corresponding to the generated token value after receiving the user terminal to obtain a plaintext of the user data. For another example, the acquisition end may encrypt the user data by using a public key, and the storage end may decrypt the encrypted user data by using a corresponding private key to obtain a plaintext of the user data.

At Step 604, the received user data is cached to one or more first storage spaces, and the cached user data is synchronized to a data warehouse. Specifically, Step 604 may be executed by the storage end 820.

In some embodiments, the first storage space may be memory space of the storage end. For example, the first storage space may be a memory space of a server (for example, the server 510) of a storage end. The memory has high write/read rate. Even if in the situation of facing a large amount of user data, the received user data may still be cached quickly. The storage end may be one or more servers. Correspondingly, when the storage end includes a plurality of servers, the storage end may correspondingly has a plurality of storage spaces (server memories), which can cache the user data to the plurality of first storage spaces. The user data may be cached to the plurality of first storage spaces in parallel or non parallel. For example, in the case of big data, the user data may be cached into a plurality of storage spaces in parallel, and parallel caching can effectively improve the cache efficiency. When the data volume is relatively small, the user data may be cached to one storage space or the user data may be cached into a plurality of first storage spaces in sequence, so that the operating burden on the server can be reduced.

In some embodiments, the first storage space may include a master warehouse and at least one slave warehouse. The slave warehouse may backup the user data cached in the master warehouse. For example, the storage end may backup the user data to one or more slave libraries when storing the received user data to the first storage space, or may backup the user data to the one or more slave libraries from the master warehouse after caching the user data to the first storage space serving as the master warehouse.

In some embodiments, the user data that has been cached in the master warehouse or the slave warehouse may be synchronized to the data warehouse. After the user data has been cached, the user data may be synchronized to the data warehouse from the first storage space in a queue manner. For example, the user data in the first storage space may be placed into a synchronous queue, and then the user data in the synchronous queue is automatically synchronized to the data warehouse by using a script. The user data is synchronized by using the queue. After the user data in the first storage space is placed into the queue, the user does not need to participate in a subsequent data synchronization process. The data warehouse may directly read the user data from the queue, so the user data may be synchronized from the first storage space to the data warehouse more conveniently and quickly.

In some embodiments, whether the synchronization of the user data is successful or not may be determined. If not, the user data that has been cached in an unsynchronized warehouse may be resynchronized. In some embodiments, whether the synchronization is successful or not may be determined by monitoring a synchronizing process. For example, whether the user data synchronized successfully may be monitored by a monitor. If it monitored that the synchronization fails, an alert may be given to a user to inform the user of processing timely. An alert manner may include text alert, voice alert, popover alert, etc. In some embodiments, an unsynchronized warehouse may refer to a warehouse that does not synchronize the user data cached therein (for example, a master warehouse and/or a slave warehouse). For example, when the user data is synchronized from the master warehouse at current, the user data in the slave warehouse may serve as a backup, and the user data cached in the slave warehouse may be not synchronized. When it fails to synchronize the user data from the master warehouse, in order to recover the user data quickly, the user data may be resynchronized after the user data that fails to synchronize is identified from the slave warehouse, so as to effectively avoid the situation of loss caused by the failure of the synchronization of the user data. For example, when it fails to synchronize the user data cached in the master warehouse, the same backup user data in the slave warehouse is placed into a synchronization queue again, which ensures that the user data may be synchronized to the data warehouse smoothly.

In some embodiments, the first storage space may be a Remote Dictionary Server (Reids) storage system. The Reids storage system is a high-performance key value database, which may not only support storing various types of user, but also support master-slave synchronization. In the Reids storage system, the slave warehouse may be connected to the maser warehouse, so as to update the user data in the slave warehouse in real time, and realize the backup of the user data cached in the maser warehouse. All operations of caching the user data to the Reids storage system may be completed in a memory, while the memory has a high-speed write/read performance, so the user data may also be cached quickly even in the situation that a large amount of user data needs to be uploaded in a high-concurrency scenario.

In some embodiments, the data warehouse may be configured to store user data. Compared with the first storage space, the data warehouse may have a larger storage capacity, and may be configured to store the user data for a long time. A user may real/query the user data from the data warehouse. The first storage space is a memory space. When the user data is cached for a long time, the memory of the server will be occupied, and the burden of the server is high, so the user data cached in the first storage space may be synchronized to the data warehouse to release the memory space and reduce the burden of the server, so that the server may cache the user data quickly even in a high-concurrency situation.

In some embodiments, the data warehouse may be a database of a distributed structure. For example, the data warehouse may consist of databases constructed in a plurality of servers. Each server constructed with the database may have the capacity to process data independently. When the user data is synchronized to the data warehouse from the first storage space, the user data may be synchronized to the data warehouses distributed at different servers (for example, the servers distributed to different node positions) from one or more storage spaces. When the user data is synchronized, the user data may be respectively synchronized to the data warehouses of different servers. The data warehouse of the distributed structure is used. After a new server is added, the user data may be automatically retrieved from the data warehouses distributed in other servers, so that horizontal expansion of the storage capacity of the data warehouse may be realized. The user data is uniformly distributed in the data warehouses of a plurality of servers, and meanwhile, load balancing is also realized, which avoids the phenomenon that there is excessive user data in the data warehouse at a certain server. In some embodiments, the user data may be synchronized to at least two data warehouses from at least two first storage spaces. The two data warehouses may be located in different servers (for example, located at different position nodes), or may be located in different partitions of the data warehouse on the same server (logical partition performed on data storage in the same data warehouse may also be considered as a distributed structure), so as to synchronize the user data from the first storage space to the data warehouse more effectively, and release the memory space of the server.

In some embodiments, the data warehouse may be an open source distributed Hybrid Transaction and Analytical Process (HTAP) database. The Hybrid Transaction and Analytical Process (HTAP) database may include TiDB, PetaData, Redshift, Apache kudu, etc. As an example, taking TiDB as an example, the TiDB database has the characteristics of compatibility with MySQL, linear extension of writing and reading, high-concurrency real-time write and real-time query of distributed traction and massive data, etc. Based on the characteristics of the TiDB database, the user data may also be synchronized from the first storage space to the TiDB database quickly when a large amount of user data is generated in a high concurrency scenario. In some embodiments, based on the characteristics of the TiDB database, the stored user data may also be read/queried from the TiDB database when the user needs to use the data.

At Step 606, common user data is synchronized to a second storage space. Specifically, Step 606 may be executed by the storage end 820.

In some embodiments, the common user data is the user data with the reading frequency greater than a preset threshold value in the data warehouse. The reading frequency may be the number of times to read the user data in the data warehouse within a certain time, for example, the number of times to read a certain piece of user data from the data warehouse within one day. The preset threshold value may be that the reading times of the user data within a set time period reaches a preset number of times. For example, the user data is read 500 times, 5000 times, and 50000 times a day. The preset threshold value may also be that the reading frequency reaches a preset ranking. For example, each type of user data will have corresponding reading frequency. The common user data may be the user data ranked at the front 10, 50, and 500 of all reading frequencies.

In some embodiments, the second storage space may be configured to query the common user data. The second storage space may be a relational database management system. The relational database management system may include MySQL, Oracle, DB2, Microsoft SQL Server, Microsoft Access, etc. As an example, taking a MySQL database as an example, the MySQL database may store the user data in different tables, rather than storing all user data in a large space, which improves the reading speed and the flexibility of data reading, and may facilitate the querying and reading of the user data. Comparing the MySQL database with the TiDB database, the TiDB database has larger capacity, and meanwhile, is compatible with MySQL database. However, compared with the MySQL database, the operation cost of the TiDB database will be higher. In order to reduce the operation cost and facilitate querying, the commonly used part user data may be placed into the MySQL database (a second storage space). When the user data is queried, the common user data may be directly queried in the second storage space, and the user data which is not commonly used may be queried in the data warehouse.

It should be noted that the previously described description related to a process 600 is only for example and explanation rather than limiting the scope of application of the application. Various modifications and variations may be made to the process 600 by those skilled in the art under the guidance of the application. However, these modifications and variations are still within the scope of the application. For example, other steps, for example, a data analyzing step, a pre-processing step, etc., are added to the process 600.

FIG. 7 is an exemplary flowchart of caching user data to a first storage space according to some embodiments of the specification. As shown in FIG. 7, a flowchart 300 includes the following steps.

At Step 702, information related to a user type is extracted from the user data. Specifically, Step 702 may be executed through the storage end 820.

The user type may be configured to represent different categories of users, such as the users of different ages, genders, occupations, preferences, habits, activity, etc. In some embodiments, user data may be answers obtained after users answer a survey questionnaire. In some embodiments, information related to the user type may be acquired from the answers answered by the users. For example, the ages of the users are acquired from the age questions answered by the users, and the genders of the users are acquired from the gender questions answered by the users. In some embodiments, the user data may also be the parameters that are transmitted when the users transmit questionnaire answers and are related to user devices. The user devices may be mobile phones, tablet computers, etc. For example, the parameter may be a device model number parameter, or a device using habit parameter (for example, a use duration, a use time period, etc.).

At Step 704, the user data is cached to the first storage space matched with the information. Specifically, Step 704 may be executed through the storage end 820.

In some embodiments, the storage end may have a plurality of first storage spaces. Each first storage space may be respectively configured to store different types of user data. For example, there are three first storage spaces A, B, and C in total, wherein A is configured to store the questionnaires answered by the users at the age of 20 to 30, and B is configured to store the questionnaires answered by the users at the age of 30 to 40, and C is configured to store the questionnaires answered by the users at the age of 40 to 50. In some embodiments, the information may be matched with the first storage space after the information related to the user type is obtained through Step 702. For example, if the information is 20 to 30 years old, the corresponding user data is stored in A.

In some embodiments, when the user data is cached to the first storage space matched with the information, whether the amount of the user data cached in the first storage space matched with the information is higher than a preset threshold value may also be determined. If not, the user data may be cached to the first storage space. The amount of the user data may be the number of answered survey questionnaires. Correspondingly the threshold value is the number of answered survey questionnaires, for example, 20 questionnaires, 30 questionnaires, etc. The amount of the user data may also be the size of data. Correspondingly, the threshold value is the size of the stored data, for example, 2 MB, 3 MB, etc. In some embodiments, threshold values that may be set for different first storage spaces may be the same or may be different. In some embodiments, the threshold values may be determined according to actual survey requirements, for example, focus on 20-30 years old, then the threshold value of the corresponding first storage space is set higher.

It should be noted that the previously described description related to a process 300 is only for example and explanation rather than limiting the scope of application of the application. Various modifications and variations may be made to the process 300 by those skilled in the art under the guidance of the application. However, these modifications and variations are still within the scope of the application. For example, other steps, for example, a data analyzing step, a pre-processing step, etc., are added to the process 300.

FIG. 8 is a module diagram of a data collection system 400 according to some embodiments of the application. As shown in FIG. 6, the data collection system 400 may include an acquisition end 810 and a storage end 820.

For example, the acquisition end 810 may be configured to receive at least one piece of user data, and send the user data to the storage end. In some embodiments, the user data may include any form of data, for example, documents, texts, letters, numbers, pictures, voice, video, two-dimensional bar code, various program codes, etc. In some embodiments, the acquisition end 810 may send the user data to the storage end through a network (for example, the network 520). In some embodiments, the acquisition end 810 may be configured to encrypt the user data after receiving the user data. An encryption manner may include one or a combination of token encryption, a public key encryption technology, digital certificate, symmetric encryption, asymmetric encryption, etc.

The storage end 820 may be configured to cache the received user data to one or more first storage spaces, and synchronize the user data that has been cached to a data warehouse. In some embodiments, the storage end 820 may be configured to receive, store, process, and send the user data, etc. For example, the storage end may receive the survey questionnaire from the acquisition end, and perform processing (for example, encrypting, decrypting, splitting, merging, computing, and analyzing) on the survey questionnaire. In some embodiments, the storage end 820 may be configured to decrypt the encrypted user data first before caching the user data. In some embodiments, the first storage space may be memory space of the storage end. In some embodiments, the first storage space includes a master warehouse and at least one slave warehouse. The slave warehouse backups the data cached in the master warehouse. In some embodiments, the first storage space may be a Remote Dictionary Server (Reids) storage system.

In some embodiments, the storage end 820 may be configured to extract information related to the user type from the user data, and cache the user data to the first storage space matched with the information. In some embodiments, the storage end 820 may be configured to determine whether the amount of the user data cached in the first storage space matched with the information is higher than a preset threshold value or not. If not, the user data may be cached to the first storage space.

In some embodiments, the storage end 820 may be configured to synchronize the user data that has been cached to the data warehouse. The data warehouse is configured to store the user data. The data warehouse may be configured to store the user data. In some embodiments, the storage end 820 may be configured to synchronize the user data that has been cached in the master warehouse or the slave warehouse to the data warehouse, and determine whether the synchronization is successful or not. If not, the user data that has been cached in an unsynchronized warehouse is resynchronized. In some embodiments, the data warehouse is a database of a distributed structure. In some embodiments, the data warehouse is an open source distributed HTAP database.

In some embodiments, the storage end 820 may synchronize the common user data to a second storage space. The second storage space may be configured to query the common user data. The common user data may be the user data with the reading frequency greater than a preset threshold value in the data warehouse. In some embodiments, the second storage space is a relational database management system.

Reference may be made to the flowchart part of the application for specific description of each module of the data collection system, for example, related description of FIG. 6 to FIG. 7.

It should be understood that the system and modules thereof shown in FIG. 8 may be implemented in various manners. For example, in some embodiments, the system and the modules thereof may be implemented by hardware, software, or a combination of software and hardware. The hardware part may be implemented by a special logic. The software part may be stored in a memory and executed by a proper instruction execution system such as a microprocessor or dedicated design hardware. Those skilled in the art can understand that the previously described method and system may be implemented by using a computer-executable instruction and/or including in a processor control code. Such a code is provided in, for example, a carrier medium like a magnetic disk, a Compact Disc (CD), or a Digital Video Disk-Read Only Memory (DVD-ROM), a programmable memory like a read-only memory (firmware), or a data carrier like an optical or electronic signal carrier. The system and modules thereof in the application may be implemented by a hardware circuit, for example, a very-large-scale integrated circuit or gate array, a semiconductor like a logic chip, a transistor, etc., or a programmable hardware device like a field-programmable gate array, a programmable logic device, etc., or may be implemented by, for example, various types of software executed by a processor, or may be implemented by a combination (for example, firmware) of the hardware circuit and the software.

It is to be noted that the above description about a data collection system and modules thereof is only for ease of description and may not limit the application to the scope of the listed embodiments. It can be understood that those skilled in the art, after understanding the principle of the system, may freely combine each module or form subsystems for connection with the other modules without departing from the principle. For example, in some embodiments, for example, the acquisition end 810 and the storage end 820 disclosed in FIG. 8 may be different modules in one system, or may be one module that realizes functions of two or more modules above. For example, the acquisition end 810 and the storage end 820 may be two modules, or may be one module that has receiving and storing functions at the same time. For example, each module may share one storage module. Various modules may also have respective storage modules. Such transformations all fall within the scope of protection of the application.

The embodiments of the application may have, but are not limited to, the following beneficial effects. (1) The user data is cached to the first storage space after receiving the user data, then the user data is synchronized to the data warehouse. Finally, part of the commonly used user data is synchronized to the second storage space. The first storage space has high cache speed. The data warehouse may be of a distributed structure and may store massive user data.

Therefore, the user data may also be uploaded timely even in a high-concurrency scenario, and the user data does not lose easily. (2) Both the data warehouse and the second storage space may be configured to query/read data. A user may select to read/query the data in the data warehouse or the second storage space conveniently and quickly. (3) After the acquisition end receives the user data, the user data is cached after being encrypted, which improves the security of the user data. (4) The first storage space adopts mode of master warehouse and slave warehouses, may backup by the user data, and has high data collection fault tolerance. It is to be noted that different beneficial effects may be achieved in different embodiments. The beneficial effects achievable in different embodiments may be any one or combination of the above, or may be any other achievable beneficial effects.

The basic concepts have been described above. It is apparent to those skilled in the art that the above detailed disclosures are merely examples and not intended to limit the specification. Those skilled in the art may make various modifications, improvements, and corrections to the specification, even though not specified herein. Such modifications, improvements, and corrections are suggested in the specification, and thus still fall within the spirit and scope of the exemplary embodiments of the specification.

In addition, specific terms are used in the application to describe the embodiments of the application. For example, "an embodiment", "one embodiment", and/or "some embodiments" mean/means a certain feature, structure, or characteristic related to at least one embodiment of the specification. Therefore, it is to be emphasized and noted that "one embodiment", or "an embodiment", or "an alternative embodiment" mentioned twice or for many times at different positions in the specification does not always refer to the same embodiment. In addition, some features, structures, or characteristics in one or more embodiments of the specification may be combined as appropriate.

In addition, those skilled in the art can understand that each aspect of the specification may be explained and described with a plurality of patentable sorts or conditions, including combinations of any new or useful procedures, machines, products, or substance, or any new and useful improvements thereof. Correspondingly, each aspect of the specification may be executed completely by hardware, executed completely by software (including firmware, resident software, microcodes, etc.), or executed by a combination of the hardware and the software. The hardware or software may be called a "data block", "module", "engine", "unit", "component", or "system". In addition, each aspect of the specification may be represented as a computer product in one or more computer-readable media, and the product includes a computer-readable program code.

The computer storage medium may include a propagated data signal with a computer program code therein, for example, on a baseband or as a part of a carrier. The propagated signal may be represented in many forms, including an electromagnetic form, an optical form, the like, or a proper combination form. The computer storage medium may be any computer-readable medium except a computer-readable storage medium, and the medium is connected to at least one instruction execution system, apparatus, or device to implement a program for communication, propagation, or transmission. The program code in the computer storage medium may be propagated through any suitable medium, including radio, a cable, an optical fiber, a Radio Frequency (RF), a similar medium, or any combination of the media.

The computer program code required by the operation of each part of the specification may be written by any one or more programming languages, including an object-oriented programming language such as Java, Scala, Smalltalk, Eiffel, JADE, Emerald, C++, C #, VB.NET, and Python, a conventional procedural programming language such as C language, Visual Basic, Fortran2003, Perl, COBOL2002, PHP, and ABAP, a dynamic programming language such as Python, Ruby, and Groovy, another programming language, etc. The program code may run completely in a user computer, or run in the user computer as an independent software package, or partially run in the user computer and partially run in a remote computer, or run completely in the remote computer or a processing device. Under the latter condition, the remote computer may be connected with the user computer through any network form such as a Local Area Network (LAN) or a Wide Area Network (WAN), or connected to an external computer (for example, through the Internet), or in a cloud computing environment, or used as service such as Software as a Service (SaaS).

In addition, unless specified in the claims, the order of the processing elements and sequence, use of numerals and letters, or use of other names in the specification is not intended to limit the orders of the flows and methods of the specification. Although some invention embodiments that seem useful at present are discussed through various examples in the above disclosure, it should be understood that such details only achieve a purpose of description, and the appended claims are not limited to the disclosed embodiments and intended to cover all corrections and equivalent combinations consistent with the essence and scope of the embodiments of the specification instead. For example, the system component described above may be implemented through a hardware device, but may also be implemented only through a software solution. For example, the described system is installed in an existing processing device or mobile device.

Similarly, it should be noted that, for simplifying the expressions disclosed in the specification to help to understand one or more invention embodiments, multiple features may sometimes be incorporated into one embodiment, drawing, or the description thereof in the above description about the embodiments of the specification. However, such a disclosure method does not mean that an object of the specification needs more features than those mentioned in the claims. In practice, the features of the embodiment are fewer than all features of a single embodiment disclosed above.

Numerals describing the numbers of components and attributes are used in some embodiments. It should be understood that such numerals for describing the embodiments are modified with modifiers "about", "approximately", or "substantially" in some examples. Unless otherwise specified, "about", "approximately", or "substantially" represents that the numeral allows a change of ±20%. Correspondingly, in some embodiments, numerical parameters used in the specification and the claims are all approximate values, and the approximate values may change according to characteristics required by individual embodiments. In some embodiments, the numerical parameter should consider specified valid digits and adopt a general digit retention method. Although numerical ranges and parameters, in some embodiments of the specification, used to confirm the breadths of scopes thereof are approximate values, such numerical values are set as accurately as possible in a possible scope in specific embodiments.

The entire contents of each patent, patent application, patent application disclosure, and other materials such as articles, books, specifications, publications, and documents, cited in the specification are incorporated in the specification by reference. Except historical application files inconsistent or conflicting with the contents of the specification as well as files (appended to the specification at present or latter) limiting the broadest scope of the claims of the specification. It is to be noted that the description, definition, and/or use of terms in the specification are/is taken as final if the description, definition, and/or use of terms in the materials appended to the specification are/is inconsistent or conflict/conflicts with the contents as described in the specification.

It should finally be understood that the embodiments in the specification are merely used to explain the principle of the embodiments of the specification. Other transformations may also fall within the scope of the specification. Therefore, as an example rather than restriction, alternative configuration of the embodiments of the specification may be considered to be consistent with the teaching of the specification. Correspondingly, the embodiments of the specification are not limited to the embodiments clearly introduced and described in the specification.

We claim:

1. A method for automatically generating a data determination result, comprising the steps of:
   sending, by an acquisition end, a data acquisition module to a plurality of user terminals, and sending first data fed back by the user terminals on the data acquisition module to an analysis end;
   generating, by the analysis end, a display manner of a data determination result on the basis of a configuration condition, wherein the display manner comprises analysis items, a first operation logic for determining analysis values of the analysis items and/or a second operation logic for determining cross analysis values of different analysis items, and
   determining, by the analysis end, the analysis values of the analysis items and/or the cross analysis values of the different analysis items in the display manner from the first data, and generating a data determination result;
   determining analysis items respectively included in a row header and a line header in the display manner, wherein the analysis end determines positions of the analysis items on the basis of a configuration condition,
   determining a first operation logic and a second operation logic on the basis of a logical relationship,
   encoding the analysis items of the row header or the line header and adding a code of the analysis item to the analysis values of the other analysis items when an error between an analysis value of an analysis item and the analysis values of other analysis items in the row header or the line header is greater than a first preset threshold value,
   obtaining a first cross analysis value and a second cross analysis values, each of the cross analysis values obtained on the basis of a first analysis item and the other analysis items in the same row header or line header as the first analysis item; and
   adding a code of the analysis item to the second cross analysis value when an error between the first cross analysis value and the second cross analysis value is greater than a second preset threshold value, wherein the first analysis item is from the analysis items of the row header and/or the line header.

2. The method as claimed in claim 1, wherein the configuration condition comprises the analysis items, the logical relationship, and a position relationship among the analysis items.

3. The method as claimed in claim 2, wherein the step of generating the configuration condition comprises:
   generating, by an analysis end, a configuration option unit on the basis of a data acquisition module, and sending the configuration option unit to an acquisition end; and
   extracting, by the analysis end, the analysis items, and the position relationship and the logical relationship among the analysis items from third data fed back by the acquisition end to the configuration option unit, and generating the configuration condition.

4. The method as claimed in claim 3, further comprising the step of: caching the third data.

5. The method as claimed in claim 1, wherein step of determining, by the analysis end, the analysis values of the analysis items and/or the cross analysis values of the different analysis items in the display manner from the first data, and generating a data determination result further comprises:
   respectively mapping the first data with the analysis items in the row header and the analysis items in the line header to obtain statistical values of the analysis items and cross statistical values of the different analysis items;
   performing an operation on the statistical values by using the first operation logic to obtain the analysis values; and
   performing an operation on the statistical values and/or the cross statistical values by using the second operation logic to obtain the cross analysis values.

6. The method as claimed in claim 1, further comprising the steps of:
   transmitting second data to the analysis end when the user terminals feed back the first data; and
   determining, by the analysis end, the analysis values of the analysis items and/or the cross analysis values of the different analysis items in the display manner from the first data and/or the second data, and generating a data determination result.

7. The method as claimed in claim 6, wherein the second data comprises:
   position information of the user terminals, device information of the user terminals, and the device use information of the user terminals.

8. The method as claimed in claim 1, wherein a confidence degree is configured for the data determination result, and the confidence degree is in positive correlation with a data volume of the first data.

9. The method as claimed in claim 1, further comprising the steps of:
   receiving, by the acquisition end, at least one piece of user data that comprises any one or more of the first data and the data determination result, and sending the user data to a storage end;
   caching, by the storage end, the received user data to one or more first storage spaces, and synchronizing the cached user data to a data warehouse which is used for storing the user data; and
   synchronizing, by the storage end, common user data to a second storage space, wherein the second storage space is configured to query the common user data, and the common user data refers to the user data with the read frequency greater than a preset threshold value in the data warehouse.

10. The method as claimed in claim 9, wherein the first storage space comprises a master warehouse and at least one slave warehouse, and the slave warehouse backups the data cached in the master warehouse.

11. The method as claimed in claim 10, wherein the step of synchronizing the cached user data to a data warehouse comprises:
   synchronizing the user data cached in the master warehouse or the slave warehouse to the data warehouse;
   determining whether the synchronization is successful; and if not, resynchronizing the user data that has been cached in an unsynchronized warehouse.

12. The method as claimed in claim 9, further comprising the steps of:
   encrypting, by the acquisition end, the user data after receiving the user data; and
   decrypting, by the storage end, the encrypted user data after caching the user data.

13. The method as claimed in claim 9, wherein the step of caching, by the storage end, the received user data to one or more first storage spaces comprises:
   extracting information related to a user type from the user data; and
   caching the user data to the first storage space matched with the information.

14. The method as claimed in claim 13, wherein the step of caching the user data to the first storage space matched with the information comprises:
   determining whether a volume of the user data cached in the first storage space matched with the information is greater than a preset threshold value; and
   if not, caching the user data to the first storage space.

15. The method as claimed in claim 9, wherein the first storage space is a memory space of the storage end.

16. An apparatus for automatically generating a data determination result, comprising:
   a processor, wherein the processor is configured to execute the method as claimed in claim 1.

* * * * *